(12) United States Patent
Lee et al.

(10) Patent No.: US 8,467,798 B2
(45) Date of Patent: Jun. 18, 2013

(54) METHOD OF PERFORMING CELL RESELECTION IN WIRELESS COMMUNICATION SYSTEM

(75) Inventors: Seon Don Lee, Seoul (KR); Young Dae Lee, Seoul (KR); Sung Duck Chun, Seoul (KR); Seung June Yi, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 12/673,973

(22) PCT Filed: Aug. 20, 2008

(86) PCT No.: PCT/KR2008/004841
§ 371 (c)(1),
(2), (4) Date: Feb. 17, 2010

(87) PCT Pub. No.: WO2009/025494
PCT Pub. Date: Feb. 26, 2009

(65) Prior Publication Data
US 2011/0053597 A1      Mar. 3, 2011

(30) Foreign Application Priority Data

Aug. 20, 2007   (KR) .................. 10-2007-0083539

(51) Int. Cl.
*H04W 72/00*       (2009.01)

(52) U.S. Cl.
USPC ........................................ 455/450

(58) Field of Classification Search
USPC ............. 455/439, 436, 437, 444, 525, 453,
455/446, 67.11, 424, 445, 452.1, 452.2, 450,
455/451; 370/252, 331, 209, 230, 332, 333
See application file for complete search history.

(56) References Cited

U.S. PATENT DOCUMENTS

| | | | |
|---|---|---|---|
| 5,930,241 A * | 7/1999 | Fried | 370/328 |
| 6,944,463 B2 * | 9/2005 | Gunreben et al. | 455/453 |
| 6,990,348 B1 * | 1/2006 | Benveniste | 455/447 |
| 7,224,977 B2 | 5/2007 | Cavalli et al. | |
| 7,333,441 B2 * | 2/2008 | Balletti et al. | 370/252 |
| 7,890,110 B2 * | 2/2011 | Moon et al. | 455/438 |
| 8,005,482 B2 * | 8/2011 | Tolli et al. | 455/453 |
| 2003/0153315 A1 * | 8/2003 | Gunreben et al. | 455/445 |
| 2004/0053630 A1 * | 3/2004 | Ramos et al. | 455/500 |
| 2008/0311924 A1 * | 12/2008 | Lucidarme | 455/452.1 |

FOREIGN PATENT DOCUMENTS

WO     2004/043104 A1    5/2004

\* cited by examiner

*Primary Examiner* — Melody Mehrpour
(74) *Attorney, Agent, or Firm* — Lee, Hong, Degerman, Kang & Waimey

(57) ABSTRACT

A method of performing cell reselection in a wireless communication system includes receiving cell load information and performing cell reselection by using the cell load information. It is possible to achieve traffic balancing on user equipments using a wireless network.

18 Claims, 8 Drawing Sheets

METHOD OF PERFORMING CELL RESELECTION IN WIRELESS COMMUNICATION SYSTEM

CROSS-REFERENCE TO RELATED APPLICATIONS

This application is a National Stage filing under 35 U.S.C. 371 of International Application No. PCT/KR2008/004841, filed on Aug. 20, 2008, which claims the benefit of earlier filing date and right of priority to Korean Application No. 10-2007-0083539, filed on Aug. 20, 2007.

TECHNICAL FIELD

The present invention relates to wireless communications, and more particularly, to a method of performing cell reselection in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

A cell selection procedure is a procedure for selecting a cell in which a service is provided to the UE. In general, the UE selects a cell having a highest signal characteristic value by performing a signal measurement procedure with a base station (BS) in all detectable frequency bands. Signal measurement criteria in a universal mobile telecommunications system (UMTS) based on the WCDMA may be found in clause 5.2.5 of the 3GPP TS 25.304 V7.1.0 (2006-12), "Technical Specification Group Radio Access Network; User Equipment (UE) procedures in idle mode and procedures for cell reselection in connected mode (Release 7)".

Cell selection may be ineffective when using a method of selecting another cell according to criteria on quality or strength of a signal received by the UE from the BS. For example, assume that a first cell and a second cell geographically overlap with each other and operate using different frequency bands, and the UE is located near a boundary region between the two cells. In this case, a signal characteristic value of the first cell and a signal characteristic value of the second cell are almost the same when measured by the UE. However, even in a case where the number of UEs receiving a previous service in the first cell is four and the number of UEs receiving the previous service in the second cell is one, the UE may select the first cell. As a result, a bandwidth that can be simultaneously allocated to the UEs decreases in the first cell. In addition, a small number of UEs provide services in the second cell and thus an idle duration increases. The idle duration is a duration in which an available bandwidth is not used. That is, there is a problem in that the available bandwidth provided in the entire system cannot be sufficiently used.

Accordingly, there is a need for a method of effectively performing cell reselection.

DISCLOSURE OF INVENTION

Technical Problem

The present invention provides a method of performing cell reselection by considering a load of neighbor cells.

The present invention also provides a method of performing cell reselection according to a cell-specific criterion.

Technical Solution

In an aspect, a method of performing cell reselection in a wireless communication system includes receiving cell load information, and performing cell reselection by using the cell load information.

In another aspect, a method of performing cell reselection in a wireless communication system includes receiving a cell selection criterion in a cell unit from a serving cell, obtaining measurement results by measuring signals of the serving cell and its neighbor cell, and performing cell reselection on the basis of the cell selection criterion and the measurement results of the serving cell and the neighbor cell.

Advantageous Effects

A user equipment performs cell reselection by using cell load information received from a base station. By balancing traffic on user equipments using a wireless network, a service satisfaction level of a user can be enhanced together with a rate of using the wireless network.

MODE FOR THE INVENTION

Figure 1:
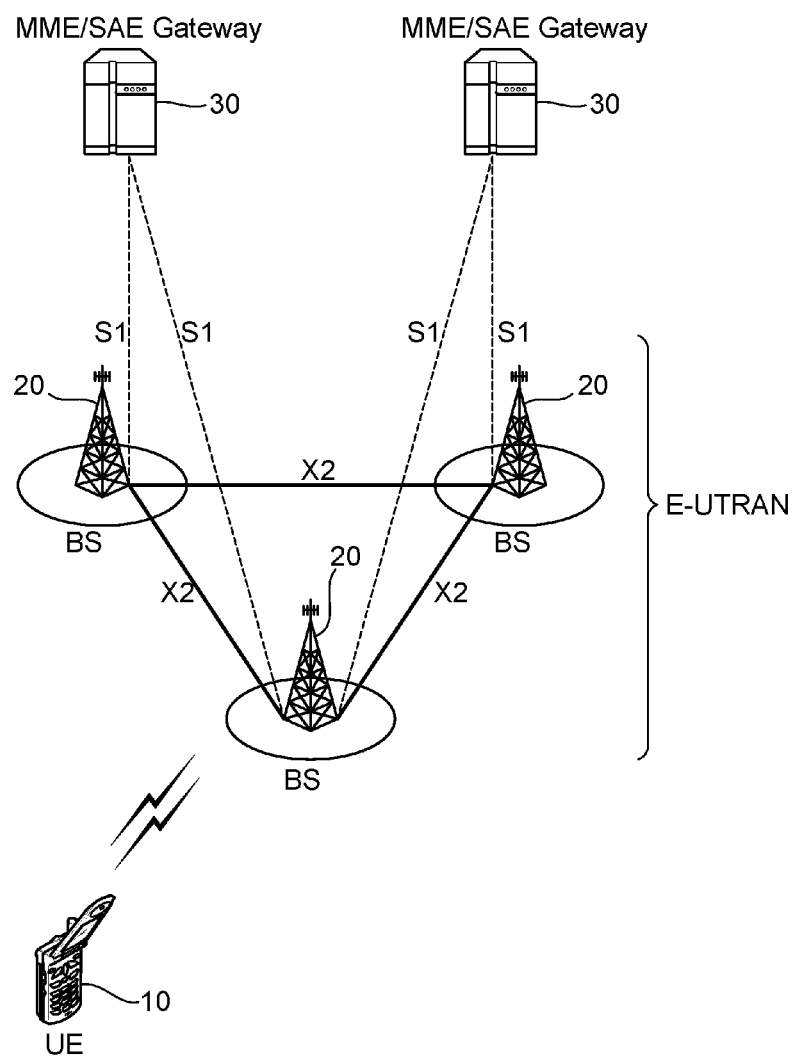
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/system architecture evolution (SAE) 30. The S1 interface supports a many-to-many relation between the BS 20 and the MME/SAE 30.

Figure 2:
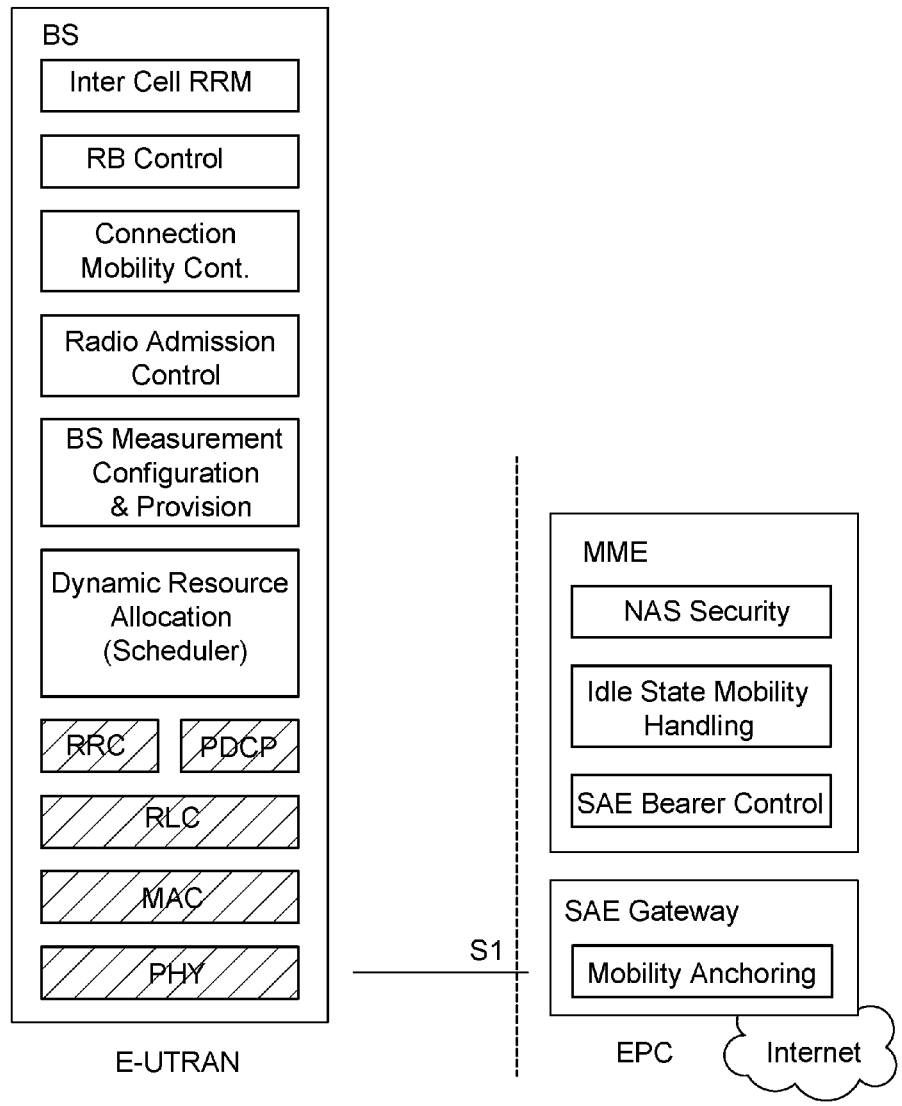
FIG. 2 is a block diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes indicate radio protocol layers and white boxes indicate functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the SAE; (4) scheduling and transmission of paging messages; (5) scheduling and transmission of broadcast information; and (6) measurement and measurement reporting configuration for mobility and scheduling.

The MME performs the following functions: (1) distribution of paging messages to the BSs; (2) security control; (3) idle state mobility control; (4) SAE bearer control; and (5) ciphering and integrity protection of non-access stratum (NAS) signaling.

The SAE gateway performs the following functions: (1) termination of a user plane packet for paging; and (2) user plane switching for the support of UE mobility.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 3:
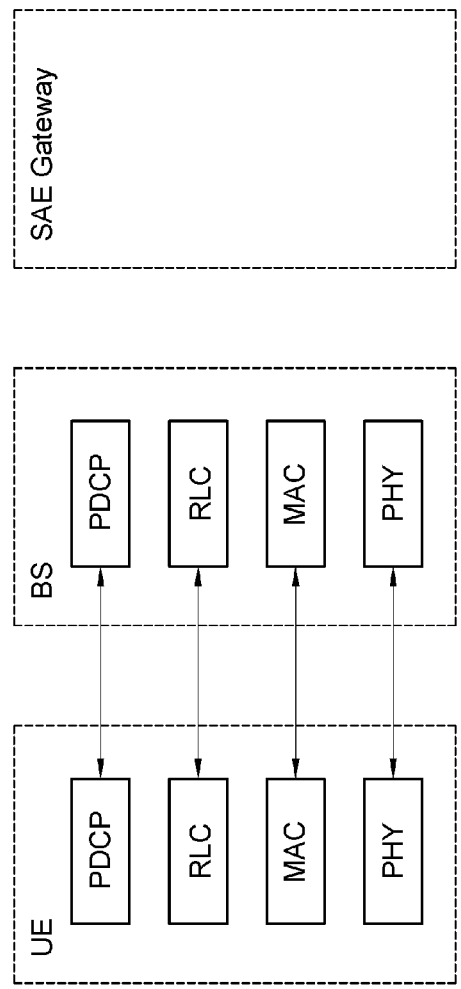
FIG. 3 is a diagram showing a radio protocol architecture for a user plane.
Figure 4:
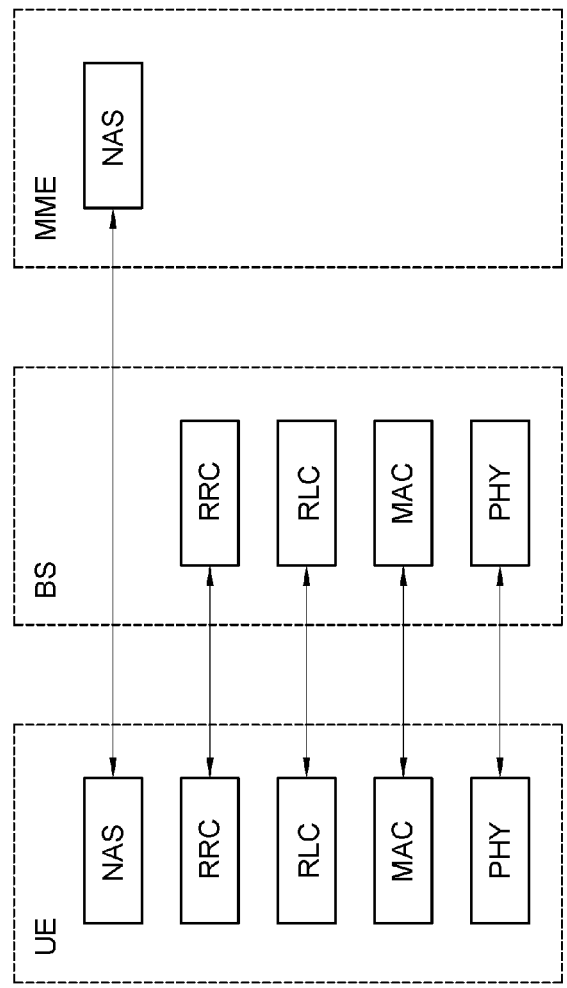
FIG. 4 is a diagram showing a radio protocol architecture for a control plane.

FIG. 3 is a diagram showing a radio protocol architecture for the user plane. FIG. 4 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 3 and 4, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel. The PHY layer can be modulated by orthogonal frequency division multiplexing (OFDM). Time and/or frequency can be utilized as radio resources.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of an RLC PDU fails.

A packet data convergence protocol (PDCP) layer belongs to the second layer and performs a header compression function. When transmitting an IP packet such as an IPv4 packet or an IPv6 packet, a header of the IP packet may contain relatively large and unnecessary control information. The PDCP layer reduces a header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform authentication, SAE bearer management, security control, etc.

A downlink transport channel is used for transmitting data from the network to the UE. Examples of the downlink control channel include a broadcast channel (BCH) for transmitting system information and a downlink-shared channel (DL-SCH) for transmitting user traffic or control messages. Traffic of downlink multicast or broadcast service or control messages can be transmitted on the DL-SCH or an additional downlink multicast channel (MCH). An uplink transport channel is for transmitting data from the UE to the network. Examples of the uplink transport channel include a random access channel (RACH) for transmitting an initial control message and an uplink-shared channel (UL-SCH) for transmitting user traffic or control messages.

The BS manages radio resources of one or more cells. One cell is configured to have at least one of bandwidths such as 1.25 MHz, 2.5 MHz, 5 MHz, 10 MHz, 20 MHz, etc., and provides downlink or uplink transmission services to a plurality of UEs. In this case, different cells can be configured to provide different bandwidths. Cell configuration can be achieved in such as manner that several cells geographically overlap by using different frequencies.

The BS informs the UE of basic information for network access by using system information. The system information includes necessary information which needs to be known to the UE so as to access to the BS. Therefore, the UE has to completely receive the system information before accessing to the BS and always has to maintain latest system information. Since the system information has to be known to all UEs within one cell, the BS periodically transmits the system information.

Now, a cell selection procedure performed by the UE in an idle mode will be described. Hereinafter, a physical signal characteristic in association with a signal strength or a signal-to-interference plus noise ratio (SINR) will be simply referred to as a signal characteristic.

The purpose of cell selection is basically to register the UE to the network so as to receive a service from the BS. Herein, if the strength or quality of signals between the UE and the BS deteriorates due to mobility of the UE, the UE reselects another cell to maintain the quality of data transmission.

The cell selection may be carried out according to a signal characteristic depending on a wireless environment. Criteria used in the cell selection performed by the UE may be as follows: (1) UE capability; (2) subscriber information; (4) camp load balancing; and (4) traffic load balancing. The UE capability denotes that a cell is selected according to a frequency band selectable by the UE. This is because a frequency band that can be used by the UE itself may be limited. The subscriber information denotes that the UE can be configured to enable or disable cell selection according to the subscriber information or a service provider's policy. The camp load balancing denotes that a cell used by a small number of UEs is selected in order to reduce a load resulted from data generated when a plurality of UEs in the idle mode are activated in one cell. The traffic load balancing is for changing a cell in order to reduce a load resulted from data generated in activated UEs. By using the camp load balancing and the traffic load balancing, UEs within the same cell can perform communication by sharing radio resources. In addition, since load balancing is achieved between cells, the radio resources can be effectively used.

Figure 5:
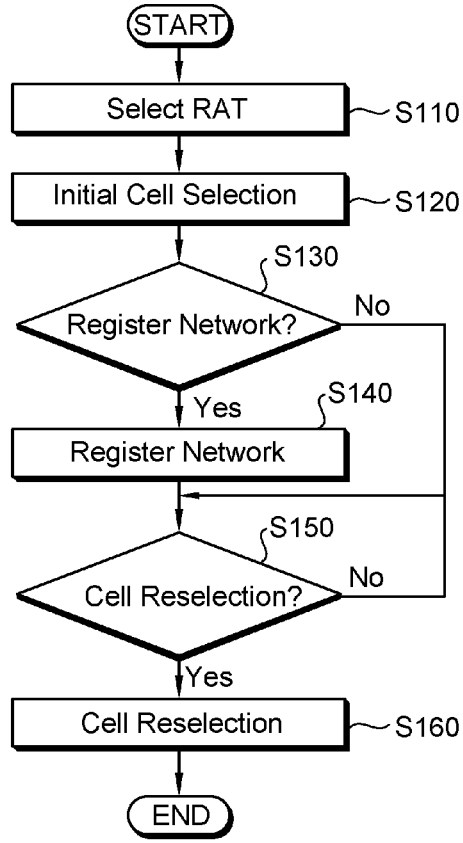
FIG. 5 is a flowchart showing a cell selection procedure performed by a user equipment in an idle mode.

FIG. 5 is a flowchart showing a cell selection procedure performed by a UE in the idle mode.

Referring to FIG. 5, in step S110, the UE selects a radio access technology (RAT) to communicate with external networks (e.g., a public land mobile network (PLMN)) through which services are provided to the UE. Examples of the RAT include a GSM EDGE radio access network (GERAN), a UMTS terrestrial radio access network (UTRAN), an evolved-UTRAN (E-UTRAN), etc. However, the RAT is not limited thereto. PLMN and RAT information may be selected by a user of the UE or may be pre-stored in the UE.

In step S120, the UE performs an initial cell selection process. Among cells in which strength or quality of a signal from a BS in association with the selected RAT is greater than a specific threshold, the UE selects a cell having a greatest value. After performing the initial cell selection process, the UE receives system information periodically transmitted from the selected cell (i.e., serving cell). The threshold denotes a value defined in the system to ensure quality of a physical signal in a process of transmitting or receiving data. Therefore, the threshold may vary depending on the RAT in use.

In step S130, the UE determines whether network registration is required. In step S140, if the network registration is required, the UE registers its information to the network so as to receive a service (e.g., paging) from the network. The UE is registered to the network when network information known to the UE is different from that obtained from the system information, instead of being registered to the network to be accessed in every cell selection process of the UE.

In step S150, the UE determines whether cell reselection is required while a service is provided from the serving cell.

In step S160, if cell reselection is required, the UE performs cell reselection. If a strength or quality value measured by the serving cell is less than a value measured by a BS of a neighbor cell, the UE selects one of neighbor cells providing a signal characteristic superior to that of the serving cell. Examples of the signal characteristic to be measured include reference symbol received power (RSRP), reference symbol received quality (RSRQ), received signal strength indicator (RSSI), etc.

Hereinafter, the serving cell denotes a cell in which a UE currently receives a service. The neighbor cell denotes cells other than the serving cell and is not limited to a geographical location with respect to the serving cell.

Now, a cell selection procedure in a UTRAN will be described.

When power is initially on, a UE selects a PLMN and an RAT for wireless communication. In an initial cell selection process, the UE selects and accesses to a cell having a highest signal characteristic value by measuring signals from a BS in all frequency bands that can be detected by the UE. Examples of the signal characteristic to be measured in the UTRAN include common pilot channel (CPICH) received signal code power (RSCP), CPICH Ec/No, carrier RSSI, etc. Equation 1 below shows an example of a criterion by which the UE selects a cell in the UTRAN:

MathFigure 1

$$S_{rxlev} > 0 \text{ and } S_{qual} > 0 \quad \text{[Math.1]}$$

where $S_{qual} = Q_{qualmeas} - Q_{qualmin}$, and $S_{rxlev} = Q_{rxlevmeas} - Q_{rxlevmin} - P_{compensation}$. $S_{qual}$ denotes a cell selection quality value. $S_{rxlev}$ denotes a cell selection receive (RX) level value. $Q_{qualmeas}$ denotes a measured cell quality value expressed in CPICH Ec/N0. $Q_{rxlevmeas}$ denotes a measured cell CPICH RSCP RX level value. $Q_{qualmin}$ denotes a minimum required quality level in the cell. $Q_{rxlevmin}$ denotes a minimum required RX level in the cell. $P_{compensation}$ denotes a radio frequency (RF) dependent value.

According to Equation 1 above, the UE selects a cell in which measured signal strength (i.e., $S_{rxlev}$) is greater than a threshold (i.e., $Q_{rxlevmin} + P_{compensation}$) and signal quality (i.e., $S_{qual}$) is greater than a threshold (i.e., $Q_{qualmin}$). Herein, $Q_{rxlevmin}$, $Q_{qualmin}$, and $P_{compensation}$ are values reported by the BS to the EU by using system information.

The UE may request the network to provide a service, or may wait in the idle mode in order to receive the service from the network. The UE in the idle mode repeats the cell reselection procedure in which a cell having a superior signal characteristic is reselected by measuring signals of the serving cell and the neighbor cells.

Figure 6:
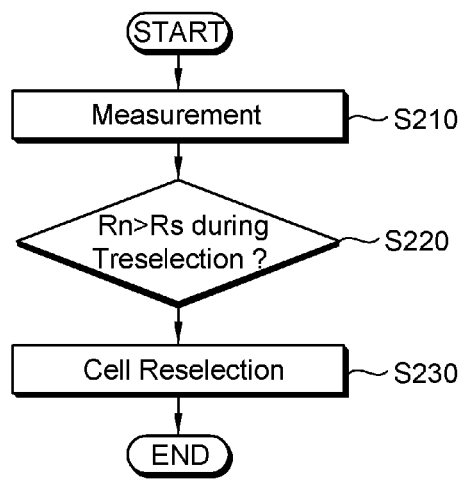
FIG. 6 is a flowchart showing a cell reselection procedure in a UTRAN.

FIG. 6 is a flowchart showing a cell reselection procedure in a UTRAN.

Referring to FIG. 6, in step S210, a UE periodically measures a signal in the idle mode.

In step S220, among cells in which a signal characteristic value Rs for a serving cell and a signal characteristic value Rn for neighbor cells satisfy the condition of Equation 1 above, it is determined whether a relation of Rn>Rs is satisfied during a reselection time period (i.e., Treselection). Rs and Rn can be obtained by Equation 2 below. This may be found in clause 5.2.6.1.4 of the 3GPP TS 25.304 V7.1.0 (2006-12), "Technical Specification Group Radio Access Network; User Equipment (UE) procedures in idle mode and procedures for cell reselection in connected mode (Release 7)".

MathFigure 2

$$Rs = Q_{meas,s} + Qhyst_s + Qoffmbms$$

$$Rn = Q_{mease,n} - Qoffset_{s,n} + Qoffmbms \qquad [\text{Math.2}]$$

In Equation 2, $Q_{meas,s}$ denotes a CPICH Ec/No value measured from a cell in which the UE is currently receiving a service. $Q_{meas,n}$ denotes a CPICH Ec/No value measured by the UE with respect to the neighbor cells. $Q_{hysts}$ is used so that the UE uses a weighting factor for the serving cell. $Q_{offsets,n}$ is used to provide a bias between a currently accessed cell and a cell to be accessed next. $Q_{offmbms}$ is used to provide a weighting factor for a cell supporting a multimedia broadcast multicast service (MBMS).

The reselection time period (i.e., Treselection) is a value reported by the BS to the UE by using system information. The purpose of using the reselection time period (i.e., Treselection) is to impose a restriction in which a cell selection condition has to be satisfied for more than a specific time period in order to prevent a specific cell from being repeatedly selected.

In step S230, if the relation of Rn>Rs is satisfied during the reselection time period (i.e., Treselection), a cell having a greatest characteristic value is selected from cells corresponding to Rn by performing a ranking process for comparing signal strength and quality. That is, another cell having the best signal characteristic is selected instead of the serving cell.

The cell selection procedure is a method of minimizing an error when a receiver analyzes a signal transmitted by a transmitter. This can be achieved since the UE receives a service from the BS by selecting a cell having a good received signal characteristic.

Figure 7:
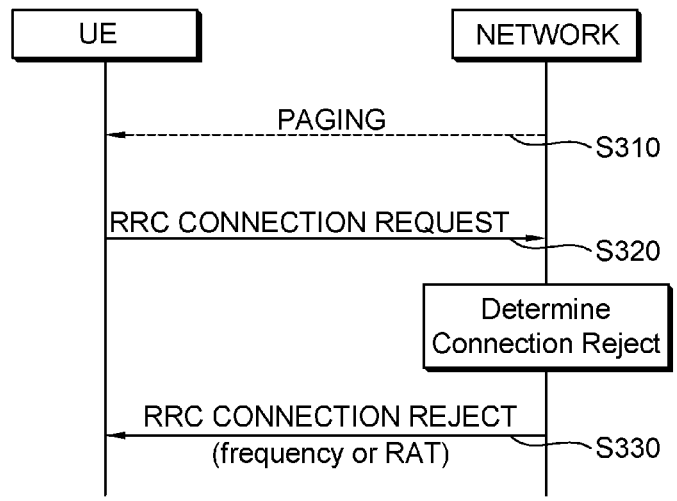
FIG. 7 is a flow diagram showing a method of regulating a load in a UTRAN.

FIG. 7 is a flow diagram showing a method of regulating a load in a UTRAN.

Referring to FIG. 7, in step S310, a BS transmits a paging message to inform a UE of notification on a service (e.g., when a call is made to the UE).

In step S320, the UE transmits an RRC connection request message to the BS to receive the service from the BS. The RRC request, message may be transmitted to request the service when the UE desires to use a specific service rather than when paging is received from the BS. In this case, as indicated by a dotted line in FIG. 7, there is no need to transmit the paging message.

In step S330, if a load of a specific cell managed by the BS is too large to provide a service to the UE requesting a new service, the RRC connection request is not granted. In this case, an RRC connection reject message is transmitted to the UE in response to the RRC connection request message transmitted by the UE to request the service. The BS may allow the RRC connection reject message to include frequency or RAT information so that the UE can detect a cell from a corresponding frequency or RAT, or may allow the RRC connection reject message to include a wait time so that the RRC connection request can be retransmitted after a predetermined wait time elapses.

If there is a need to restrict uplink access of the UE in the UTRAN due to a frequent RRC connection request or other reasons, the BS may transmit the RRC connection reject message including re-direction information (e.g., frequency band or RAT) so that a specific UE can detect a cell operated at other frequency bands or operated by other systems. The UE selects a cell at a predetermined frequency band or RAT and thereafter restarts a service request through an RRC connection establishment process.

In the UTRAN, a measurement value (e.g., RSRP) used during the initial cell selection and/or cell reselection process does not include cell load information. Therefore, load balancing is difficult to be achieved between cells.

Figure 8:
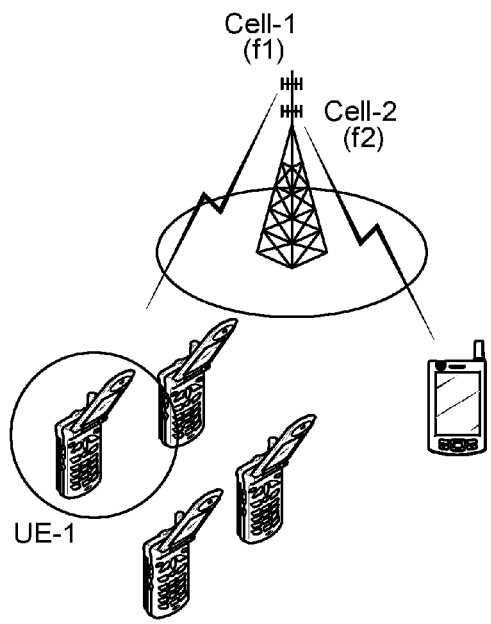
FIG. 8 shows an example of load unbalance in overlapping cells.

FIG. 8 shows an example of load unbalance in overlapping cells.

Referring to FIG. 8, a first cell (i.e., Cell-1) and a second cell (i.e., Cell-2) geographically overlap with each other and operate using different frequency bands in one BS. It can be said that a signal characteristic value (e.g., CPICH RSRP) measured by a first UE (i.e., UE-1) with respect to the Cell-1 is almost the same as a signal characteristic value for the Cell-2. Therefore, when cell reselection is determined using only a signal characteristic value, the UE-1 continuously receives a service from the Cell-1 without having to change its serving cell to the Cell-2. As a result, four UEs receive the service in the Cell-1 whereas only one UE receives the service in the Cell-2. Accordingly, a bandwidth that can be simultaneously allocated to the UEs decreases in the Cell-1. In addition, a small number of UEs provide services in the Cell-2 and thus an idle duration increases. The idle duration is a duration in which an available bandwidth is not used. That is, there is a problem in that the available bandwidth provided in the system cannot be sufficiently used.

In addition, since an RRC connection process is performed one more time in a method using the RRC connection reject message as in the case of the UTRAN, there is a problem in that uplink access for receiving a service is delayed.

In the following description, cell reselection is performed in consideration of cell load information in order to achieve load balancing between cells with respect to traffic generated in the cells.

A BS transmits to a UE a specific value periodically or according to a decision of the BS, wherein the specific value is defined with load information of each cell, in which a service is provided from the BS currently accessed by the UE, and load information of cells of a neighbor BS. The UE selects a cell by using specific load information transmitted by the BS according to cell selection criteria.

The BS may calculate a cell load in the following manners. (1) The load may be the number of UEs in a cell receiving a service from the BS. (2) The load may be a traffic amount of a service provided in each cell by the BS. The traffic amount may be an available buffer size of the BS, an uplink or downlink data throughput, a traffic amount reported from the UE, etc. (3) The load may be an RAT type. (4) The load may be a quality of service (QoS) requested by the UE, a QoS provided by the BS, a QoS of a subscriber, etc.

The cell load information can be transmitted in various formats. Examples of the various formats include a value (e.g., a processing speed), an amount (e.g., a buffer size), a class, a relative value with respect to a cell accessed by the UE, etc.

The UE in the idle mode reselects a neighbor cell on the basis of the cell load information received from the BS. Alternatively, a method of selecting a cell on the basis of the cell load information may be used together with a method of selecting a cell according to a general channel characteristic.

As a criterion for cell reselection or a condition for determining a time point, a method based on a signal characteristic or a cell load may be used. The UE may select another cell at the time point in the following cases. (1) Upon detecting a cell satisfying Rn>Rs during the reselection time (i.e., Treselection), another cell is selected. (2) Upon detecting a cell satisfying Ln>Ls during a load reselection time (i.e., Treselection-load), another cell is selected. (3) Upon detecting a cell satisfying Ln>Ls during the load reselection time (i.e., Treselection-load) and satisfying Rn>Rs during the reselection time (i.e., Treselection), another cell is selected.

In the above description, Ls denotes a cell load value of a serving cell currently accessed by the UE. Ln denotes a cell load value of a neighbor cell, which is received by the BS. The load reselection time (i.e., Treselection-load) denotes a specific threshold or a time condition which is used to prevent frequent selection of several specific cells with respect to changes in a cell load value when the UE selects cells. If the load reselection time (i.e., Treselection-load) is a numerically expressible threshold, it implies that a difference between the cell load value of the serving cell and the cell load value of the neighbor cell is greater than the threshold. If the load reselection time (i.e., Treselection-load) is the time condition, it indicates a duration in which the cell load value of the neighbor cell is greater than the cell load value of the serving cell. In addition, constraints on the threshold and the time condition may be simultaneously used in the format of a first load reselection time (Treselection-load1) and a second load reselection time (Treselection-load2).

One cell may be finally selected from cells satisfying the aforementioned cell reselection criteria in the following manners. (1) The cell is selected using the cell load information. The UE selects a cell that most satisfies a desired cell load. (2) The cell is selected using a signal characteristic together with the cell load information. Cells satisfying the cell load desired by the UE are first configured as a candidate set of selectable cells, and a cell having a best signal characteristic is selected from the cells included in the candidate set. Alternatively, cells satisfying a specific signal characteristic are first configured as a candidate set of selectable cells, and a cell that most satisfies a specific cell load desired by the UE is selected from the cells included in the candidate set.

Specifically, the 'cell load desired by the UE' may be a load value of a cell having a smallest load or may be a cell load the same as (or the most similar to) the load requested by the UE. The 'signal characteristic' may be a condition (Rn>Rs) where a signal value for a neighbor cell is greater than a signal value for a cell currently accessed by the UE or may be a minimum signal character value defined in the system.

As a minimum requirement for the selected cell, a value based on the signal characteristic defined in the UTRAN in Equation (1) above and/or a value based on the cell load can be used.

The aforementioned cell reselection method can also be equally applied to the initial cell selection process. Comparison of signal characteristics or load information of the serving cell and the neighbor cell is omitted since the serving cell is not defined in the initial cell selection.

The cell load information or information for operation based on the cell load can be transmitted to the UE by using an RRC message. Examples of the RRC message include system information, a paging message, a radio bearer setup message, a radio bearer reconfiguration message, an RRC connection request message, an RRC connection setup message, an RRC connection release message, etc.

The cell load information or the information for operation based on the cell load can be transmitted through L1 signaling or a protocol data unit (PDU) of PDCP, RLC, and MAC layers.

Figure 9:
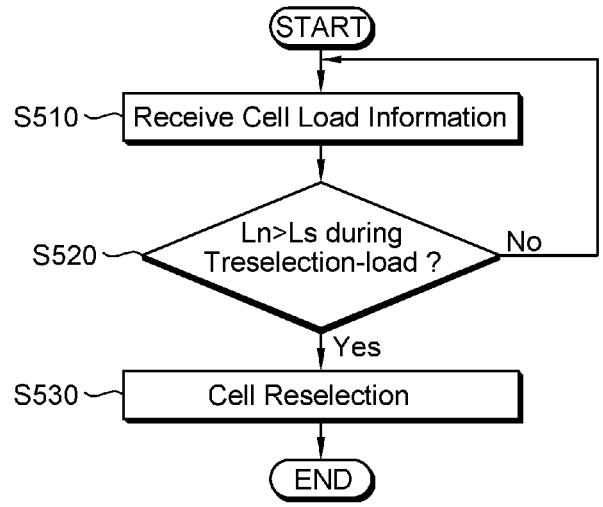
FIG. 9 is a flowchart showing a cell reselection procedure according to an embodiment of the present invention.

FIG. 9 is a flowchart showing a cell reselection procedure according to an embodiment of the present invention.

Referring to FIG. 9, in step S510, a UE receives cell load information from a BS. In step S520, during a load reselection time (i.e., Treselection-load), it is determined whether there are cells that more satisfy a cell load value requested by the UE than a current cell load. In step S530, if there are the cells more satisfying the requested cell load value, a cell having a smallest cell load is selected from the cells.

Figure 10:
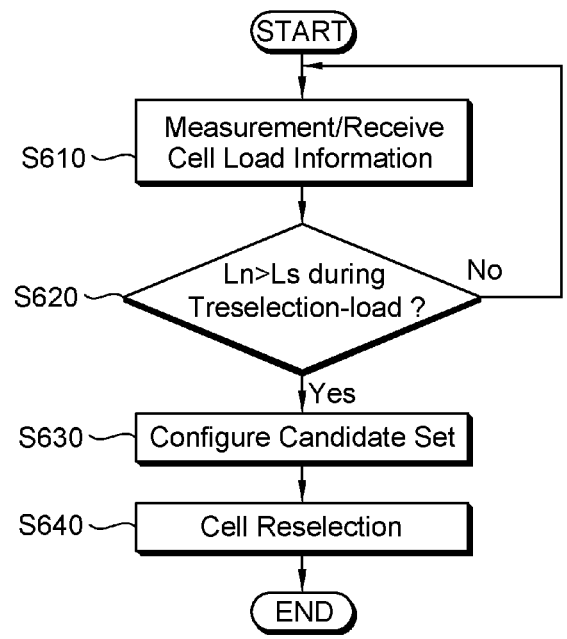
FIG. 10 is a flowchart showing a cell reselection procedure according to another embodiment of the present invention.

FIG. 10 is a flowchart showing a cell reselection procedure according to another embodiment of the present invention. In this method, a candidate set is configured based on cell load information and a cell is selected according to a signal characteristic.

Referring to FIG. 10, in step S610, a UE receives the cell load information from a BS, and periodically performs signal measurement. In step S620, during a load reselection time (i.e., Treselection-load), it is determined whether there are cells that more satisfy a cell load value requested by the UE than a current cell load. In step S630, a candidate set is configured with cells more satisfying the cell load value required by the UE. In step S640, the UE finally selects a cell having a highest signal characteristic from the cells included in the candidate set.

Figure 11:
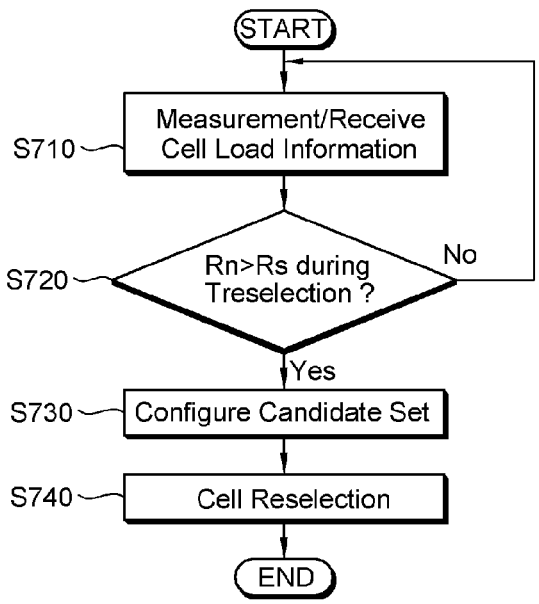
FIG. 11 is a flowchart showing a cell reselection procedure according to another embodiment of the present invention.

FIG. 11 is a flowchart showing a cell reselection procedure according to another embodiment of the present invention. In this method, a candidate set is configured based on a signal characteristic and a cell is selected according to cell load information.

Referring to FIG. 11, in step S710, a UE receives the cell load information from a BS, and periodically performs signal measurement. In step S720, during a reselection time (i.e., Treselection), it is determined whether there are cells having a signal characteristic superior to a signal characteristic of a current cell. In step S730, the candidate set is configured with cells having a signal characteristic superior to a signal characteristic requested by the UE. In step S740, the UE finally selects a cell having a smallest cell load from the cells included in the candidate set.

Now, an example of the cell selection procedure will be described on the basis of the cell load information received from the BS.

Table 1 below shows the cell load information received from the BS and the signal characteristic value measured by the UE.

TABLE 1

| Cell | Cell Load Class | Signal Characteristic Value(RSRP, dbm) |
|---|---|---|
| Cell 1(serving cell) | heavy | −80 |
| Cell 2(neighbor cell) | extreme | −120 |
| Cell 3(neighbor cell) | medium | −150 |
| Cell 4(neighbor cell) | medium | −60 |
| Cell 5(neighbor cell) | light | −70 |

Among a total of five cells, the cell 1 is a serving cell currently accessed by the UE and the remaining four cells are neighbor cells which are candidates in cell reselection. The cell load value is expressed in a class format in the order of extreme/heavy/medium/light.

When a cell is selected using the cell load information, if it is assumed that a cell having a smallest cell load desired by the UE is selected, the UE selects the cell 5 since the cell 5 has the smallest cell load.

When a cell is selected using the cell load information and the signal characteristic, the cells 3 to 5 in which loads are less than 'heavy' that is a load class of the cell 1 are configured as the candidate set, and the cell 4 having a best signal characteristic value is finally determined as a cell to be reselected.

When a cell is selected using the signal characteristic of the cell and the cell load information, the cells 4 and 5 in which signal characteristic values are superior to the signal characteristic value of the cell 1 are configured as the candidate set, and the cell 5 having a smallest load is finally determined as a cell to be reselected.

The BS transmits the cell load information of the serving cell and the neighbor cells to the UE. The UE selects a cell by using the cell load information received from the BS. By balancing traffic on UEs using a wireless network, a service satisfaction level of a user can be enhanced together with a rate of using the wireless network.

Figure 12:
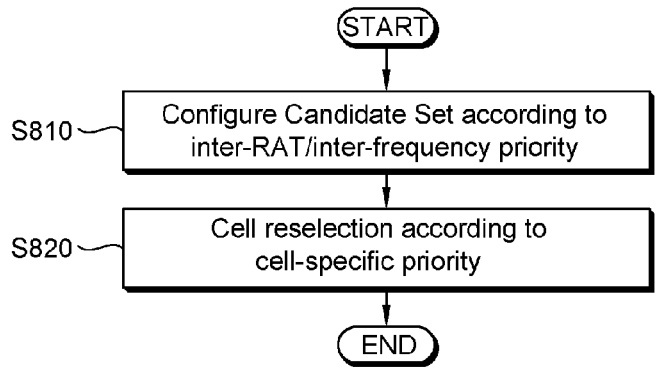
FIG. 12 is a flowchart showing a cell reselection procedure according to another embodiment of the present invention.

FIG. 12 is a flowchart showing a cell reselection procedure according to another embodiment of the present invention.

Referring to FIG. 12, in step S810, a candidate set is configured according to an inter-RAT/inter-frequency priority. The inter-RAT/inter-frequency priority indicates whether cell reselection will be performed on cells having a different RAT/different frequency in comparison with a serving cell. For example, if the inter-RAT/inter-frequency priority is lower than a priority of the serving cell, the candidate set is not configured for an inter-RAT/inter-frequency cell unless a signal of the serving cell decreases to a specific level or below. If the inter-RAT/inter-frequency priority is higher than the priority of the serving cell, the candidate set is configured on the basis of a measurement result on the inter-RAT/inter-frequency cell. If it is assumed for example that the serving cell is a UTRAN cell, and a GERAN has a lower priority than a UTRAN but an E-UTRAN has a higher priority than the UTRAN, then the UE configures the candidate set on the basis of the measurement result on cells included in the E-UTRAN.

In step S820, the UE performs cell reselection on inter-RAT/inter-frequency cells included in the candidate set according to a cell-specific priority. The cell-specific priority denotes a reselection criterion in a cell unit. For example, the reselection criterion may be cell load information or the like. In the above example, the UE may perform cell reselection on a cell having a smallest cell load in the candidate set of cells included in the E-UTRAN.

Not only the inter-RAT/inter-frequency priority but also a cell-unit priority may be used for traffic balancing at an RAT/cell level.

The proposed cell reselection method can also be applied to a method of obtaining a measurement result. In this method, cell measurement is performed according to the cell-unit priority.

Figure 13:
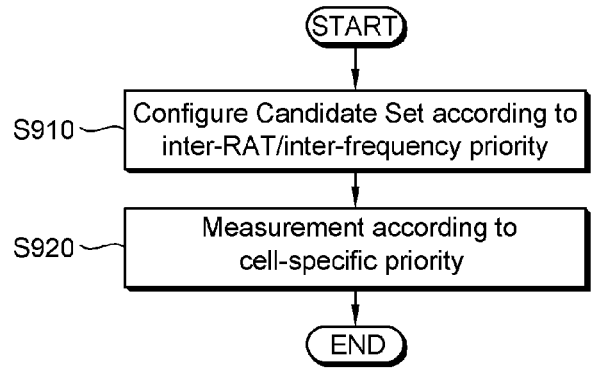
FIG. 13 is a flowchart showing a measurement procedure according to an embodiment of the present invention.

FIG. 13 is a flowchart showing a measurement procedure according to an embodiment of the present invention.

Referring to FIG. 13, in step S910, a UE configures a candidate set according to an inter-RAT/inter-frequency priority. If the inter-RAT/inter-frequency priority is higher than a priority of a serving cell, the candidate set is configured with cells having a corresponding RAT/frequency. If the inter-RAT/inter-frequency priority is lower than the priority of the serving cell, the candidate set is configured with cells having a corresponding RAT/frequency when a signal of the serving cell decreases to a specific level or below. For example, assume that the serving cell is a UTRAN cell, and a GERAN has a lower priority than a UTRAN but an E-UTRAN has a higher priority than the UTRAN. In this case, the UE configures the candidate set by using cells included in the E-UTRAN. However, for a GERAN cell, the UE configures the candidate set only when a measurement value of the serving cell decreases to a specific value or below.

In step S820, the UE performs measurement on inter-RAT/inter-frequency cells included in the candidate set according to a cell-specific priority. The cell-specific priority denotes a reselection criterion in a cell unit. For example, the reselection criterion may be cell load information or the like. In the above example, the UE may perform measurement on cells in which cell loads are below a specific range in the candidate set of cells included in the E-UTRAN.

Although only the measurement procedure is described herein, cell reselection can be performed using a measurement result obtained according to a cell-unit priority. For example, the measurement result may be obtained by measuring signals of the serving cell and the neighbor cells according to the inter-RAT/inter-frequency priority, and the cell reselection may be performed on the basis of the measurement result and cell selection criteria.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing cell selection in a wireless communication system, the method performed by the user equipment (UE) and comprising:

receiving load information indicating cell load values for a serving cell and at least one neighbor cell;

selecting a measurement cell group based on a signal level of the serving cell and priorities of the serving cell and the at least one neighbor cell;

measuring a signal quality value of the serving cell and the selected measurement cell group;

selecting a candidate target cell group from the selected measurement cell group at least one neighbor cell based on the measured signal quality value;

selecting a selected one of the at least one neighbor cell from the selected candidate target cell group as a target cell based on the received load information; and performing cell selection of the target cell, wherein:

a signal quality value of each candidate target cell in the candidate target cell group is greater than a signal quality value of the serving cell during a first time period; and the one of the at least one neighbor cell is selected as the target cell when a cell load value of the selected one of the at least one neighbor cell is less than cell load values of other neighbor cells in the candidate target cell group and the cell load value of the selected one of the at least one neighbor cell is less than the cell load value of the serving cell during a second time period.

2. The method of claim 1, wherein the received load information is based on a number of UEs associated with each cell in the selected candidate target cell group.

3. The method of claim 1, wherein the received load information is based on an amount of traffic services provided for each cell in the selected candidate target cell group.

4. The method of claim 1, wherein the received load information comprises:
    a cell load value of the serving cell; and
    a cell load value of at least one candidate target cell of the selected candidate target cell group.

5. The method of claim 1, wherein the load information is received in system information.

6. The method of claim 5, wherein the UE is in a radio resource control (RRC) idle state.

7. A user equipment (UE) comprising:
    a radio frequency (RF) unit configured for transmitting and receiving radio signals; and
    a processor operably coupled to the RF unit and configured for:
        receiving load information indicating cell load values of a serving cell and at least one neighbor cell;
        selecting a measurement cell group based on a signal level of the serving cell and priorities of the serving cell and the at least one neighbor cell;
        measuring a signal quality value of the serving cell and the selected measurement cell group;
        selecting a candidate target cell group from the selected measurement cell group based on the measured signal quality value;
        selecting one of the at least one neighbor cell from the selected candidate target cell group as the target cell based on the received load information; and
        performing cell selection of the target cell,
    wherein:
        a signal quality value of each candidate target cell in the candidate target cell group is greater than a signal quality value of the serving cell during a first time period; and
        the one of the at least one neighbor cell is selected as the target cell when a cell load value of the selected one of the at least one neighbor cell is less than cell load values of other neighbor cells in the candidate target cell group and the cell load value of the selected one of the at least one neighbor cell is less than the cell load value of the serving cell during a second time period.

8. The UE of claim 7, wherein the received load information is based on a number of UEs associated with each cell in the selected candidate target cell group.

9. The UE of claim 7, wherein the received load information is based on an amount of traffic services provided for each cell in the selected candidate target cell group.

10. The UE of claim 7, wherein the received load information comprises:
    a cell load value of the serving cell; and
    a cell load value of at least one candidate target cell of the selected candidate target cell group.

11. The method of claim 7, wherein the load information is received in system information.

12. The method of claim 8, wherein the UE is in a radio resource control (RRC) idle state.

13. The method of claim 1, wherein selecting the measurement cell group comprises:
    determining whether the signal level of the serving cell is equal to or greater than a predetermined threshold level;
    including a first cell in the measurement cell group, the first cell having a higher priority than a priority of the serving cell;
    including a second cell in the measurement cell group, the second cell having a same priority as the priority of the serving cell; and
    including a third cell in the measurement cell group, the third cell having a lower priority than the priority of the serving cell when the signal level of the serving cell is lower than the predetermined threshold level.

14. The method of claim 13, wherein the priorities correspond to frequencies on which the serving cell and the at least one neighbor cell operate.

15. The method of claim 13, wherein the priorities correspond to radio access technologies (RATs) of the serving cell and the at least one neighbor cell.

16. The UE of claim 7, wherein selecting the measurement cell group comprises:
    determining whether the signal level of the serving cell is equal to or greater than a predetermined threshold level;
    including a first cell in the measurement cell group, the first cell having a higher priority than a priority of the serving cell;
    including a second cell in the measurement cell group, the second cell having a same priority as the priority of the serving cell; and
    including a third cell in the measurement cell group, the third cell having a lower priority than the priority of the serving cell when the signal level of the serving cell is lower than the predetermined threshold level.

17. The method of claim 16, wherein the priorities correspond to frequencies on which the serving cell and the at least one neighbor cell operate.

18. The method of claim 16, wherein the priorities correspond to radio access technologies (RATs) of the serving cell and the at least one neighbor cell.

\* \* \* \* \*